United States Patent [19]

Brandenstein et al.

[11] 4,433,932
[45] Feb. 28, 1984

[54] ROLLER BEARINGS INSTALLED WITHOUT CLEARANCE AND PRELOADED

[75] Inventors: Manfred Brandenstein, Eussenheim; Rüiger Hans, Niederwerrn; Peter Horling, Mainberg; Hermann Hetterich, Heidenfeld; Gebhard Pape, Schweinfurt; Willi Gössmann, Niederwerrn, all of Fed. Rep. of Germany

[73] Assignee: SKF Kugellagerfabriken GmbH, Schweinfurt, Fed. Rep. of Germany

[21] Appl. No.: 406,907

[22] Filed: Aug. 10, 1982

[30] Foreign Application Priority Data

Aug. 17, 1981 [DE] Fed. Rep. of Germany ....... 3132442

[51] Int. Cl.³ .......................... B25G 3/00; F16B 9/00; F16L 41/00
[52] U.S. Cl. ..................................... 403/261; 403/368; 403/282; 308/236
[58] Field of Search ............... 403/261, 368, 372, 376, 403/377, 282; 308/236

[56] References Cited

U.S. PATENT DOCUMENTS 3,413,022 11/1968 Waddell ............................ 403/261
3,829,227 8/1974 Derman ............................. 403/377

FOREIGN PATENT DOCUMENTS 910690 11/1962 United Kingdom ............... 403/282
1350217 4/1974 United Kingdom .
1410123 10/1975 United Kingdom .
1440654 6/1976 United Kingdom .
1469466 4/1977 United Kingdom .
2088526 6/1982 United Kingdom .

*Primary Examiner*—Wayne L. Shedd

[57] ABSTRACT

A fastening means for securing an annular first machine element against axial displacement on an annular second machine element, said second machine element having a shoulder against which the first machine element abuts and an annular groove spaced from said shoulder comprising a first ring member circumscribing the second machine element and having one axial end face confronting and abutting an axial end face of said first machine element and being formed to define an annular pocket, a second one-piece ring made of a deformable material which is initially sleeve-shape and is adapted to engage in the annular pocket and be deformed in a radial direction as a result of axially applied pressure during assembly into the annular pocket in such a way that a portion thereof engages in the annular groove in the second machine element to secure the two in place.

4 Claims, 1 Drawing Figure

ROLLER BEARINGS INSTALLED WITHOUT CLEARANCE AND PRELOADED

BACKGROUND AND SUMMARY OF THE INVENTION

The present invention relates to means for securing machine components in a predetermined position relative to one another and has particular application to mounting of rolling bearing assemblies without clearance and preloaded on shafts or the like. The fastening arrangement includes a first ring engaging in an annular groove in the shaft and a second closed ring abutting the machine component which is held in place by the first ring.

U.S. Pat. No. 1,916,233 shows a means for fastening machine components comprising a ring constructed in two parts which is inserted in an annular groove of the shaft whereby the two parts of the bi-component ring after assembly are held together by a wire ring placed on its outside or the axial flange tabs of a sheet metal disc inserted between the machine element and the bi-component ring.

This prior arrangement has several disadvantages and drawbacks. For example, the ring engaging in the groove is constructed in two parts which not only increases the number of components but also presents the problem that with tolerance variations only one of the ring components absorbs the loading force.

Furthermore, an accurate installation of the bearing is only possible by accurate adjustment of the bi-component ring and/or the sheet metal disc and even in this instance the danger exists that under high loading forces, for example, centrifugal forces, the taught wire ring tends to loosen or the tabs of the sheet metal disc which are axially flanged at the outer end bend in this area with the result that the two ring components can therefore be pressed from the annular groove.

German Patent No. 649,793 shows an arrangement for fastening machine elements in housings or the like such as for example, bearing bushings in the bores of fork joints. In accordance with this patent, this is achieved by introducing liquid or a pasty substance in grooves in the machine elements and their carriers which include hollow cavities, which substance hardens to form solid connecting wedges between the elements.

French Patent No. 1,129,720 shows a means for fastening bearing bushings of universal joints by introducing a construction material which can be cast or sprayed into annular grooves machined near the bottom of the bearing bushing in the fork bore. This cast or sprayed material extends radially and partly covers the bottom and axially secures the bearing bushing. Suitable casting or spray type materials include plastics. However, these materials have certain disadvantages and drawbacks in these applications. For example, plastics are not suitable to transmit high axial forces or to continuously absorb impact loads. Furthermore, since most castable materials shrink during cooling, the connection is weak and tends to loosen and is, therefore, inaccurate. Plastic also ages and becomes brittle so that this is also a factor contributing to failure of the connection over a period of time. In view of this, it is clear that this type of fastening is not suitable for bearing applications which are preloaded and are without clearance.

With the above in mind, it is therefore an object of the present invention to provide a fastening means for machine components particularly bearings which are installed without clearance or preloaded on shafts or the like which on the one hand is of a relatively simplified construction and yet provides an accurate and secure mounting even after a prolonged operating time and is capable of absorbing high axial forces. To this end, the fastening arrangement includes a first ring engageable in an annular groove on one of the machine components such as a shaft and a second closed ring arranged on the outside surface of the first ring. The first ring is a one piece annular member and is initially sleeve shaped and thereafter deformed in a radial direction as a result of axially applied pressure during assembly in an annular intermediate space between the outer peripheral surface of the shaft and the second ring is mounted on the shaft in such a way that it engages in the annular groove in the shaft.

By reason of the one piece construction of the first ring which engages in the annular groove, the number of components is reduced. Further, by reason of the fact that the ring is of a deformable material, it is possible to press the ring in an axial direction into the annular gap between the outer peripheral surface of the shaft and the second ring pushed on the shaft in such a way that it fills the intermediate space and in addition enters the annular groove of the shaft and in this way effectively secures the second ring in an axial direction. The second ring therefore functions much like a swage in this respect. When the annular groove is completely filled, relatively high axial forces can be absorbed without the danger that the rings loosen even after prolonged operating time under normal operating forces. As a result of the axial fixing of the second ring during the pressing or swaging of the first ring, it is possible to accurately position the fastening rings in place. Furthermore, in order to obtain a desired preloading in the machine element or part to be fastened, a pretension or preloading force can be applied to the second ring and therefore to the machine element to be fastened independently of the axial deformation pressure on the deformable first ring.

In accordance with one embodiment of the invention, the inner surface of the second ring is constructed in such a way that the material flows inward into the annular groove of the shaft by deflecting the material flow of the deformable ring. Specifically, the second ring is provided with a curvilinear or arcuate section which deflects the material of the initially sleeve-shaped first ring inwardly into the annular groove as it is axially pressed into place.

In accordance with another embodiment, the second ring has a stepped or angular cross sectional configuration defining a shoulder at the end of the expanded bore thereof which is aligned at one end in the groove of the shaft so that as the first ring is pressed axially into the bore, the material of the ring is deformed to fill the annular groove and lock the ring members in the desired axial position for preloading, for example, the inner ring of a bearing assembly mounted on the shaft. This arrangement has the advantage that during deformation of the ring, the axially running leg can elastically expand and the elastic force always presses the formed ring under radial preloading into the annular groove.

In summary, the present invention provides a simple, accurate and secure fastening means even after prolonged operating time which makes the absorption of high axial forces possible. The ring (16) engaging in the annular groove (17) is constructed in one piece and initially sleeve-shaped from deformable construction material and is deformed to some extent in radial direction as a result of axial pressure during assembly in an annular intermediate space (20) between the outside surface (9) of the shaft or the like (10) and the ring (14) pushed on this shaft in such a way that it engages in the annular groove (17) in the shaft or the like (10).

DESCRIPTION OF THE DRAWINGS

These and other objects of the present invention and the various details and features of the operation and construction of a fastening or securing ring assembly in accordance with the present invention are hereinafter more fully set forth with reference to the accompanying drawings, wherein.

DESCRIPTION OF THE PREFERRED EMBODIMENTS

Figure 1:
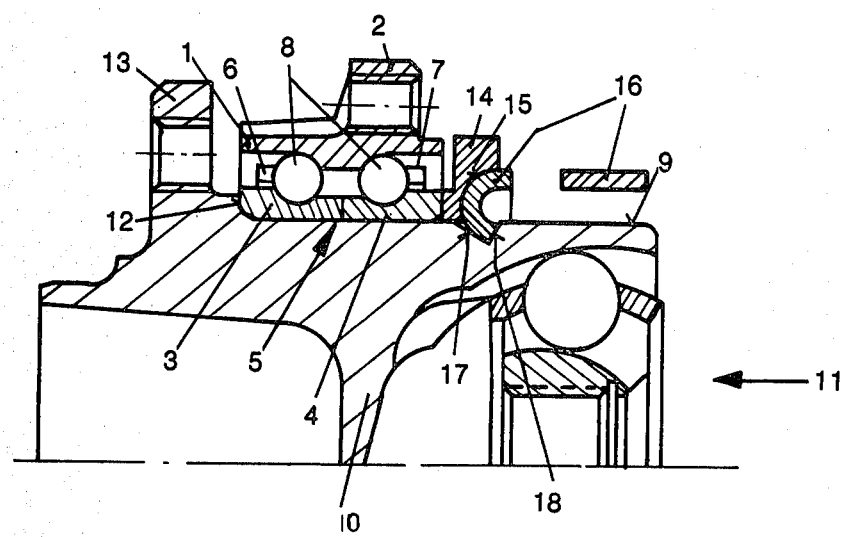
FIG. 1 is a fragmentary transverse sectional view of a hub bearing assembly incorporating a bearing positioning or fastening means in accordance with the present invention.

Referring now to the drawings and particularly to FIG. 1 thereof, the present invention is illustrated in a typical wheel bearing assembly for automotive vehicles. The wheel bearing assembly comprises an outer ring 1 having a radially outwardly directed flange 2 with a series of circumferentially spaced bolt holes 2a for fastening the outer ring of the bearing to a vehicle frame (not shown), an inner ring 5 consisting in the present instance of two inner ring components or members 3 and 4 and balls 8 arranged in two rows between the confronting spaced raceways of the inner and outer rings. The balls are circumferentially spaced by conventional cages 6 and 7. The inner ring members 3 and 4 are mounted on the outer peripheral surface 9 of a body member 10 of a homokinetic joint 11. The body member 10 has a radially outwardly directed flange 13 with a series of circumferentially spaced bolt holes 13a for fastening the body member to a wheel rim (now shown). Further, as illustrated, the body member has a shoulder 12 against which the inner ring components abut.

In accordance with the present invention, means is provided for securing the inner ring components 3 and 4 on the body member in a manner to preload the rolling elements of the bearing assembly. To this end, the mounting arrangement comprises a first annular ring member 14 which circumscribes the peripheral outer surface 9 of the body member 10 with its inner axial end face 14a abutting the outer axial end face of the inner ring component 4. The first ring 14 is locked in place by means of an initially sleeve shaped second ring 16 which as illustrated in the drawing is adapted to be pressed in an axial direction toward the first ring 14 to engage an arcuate or curvilinear surface 15 formed in the outer axial end face of the ring 14 which defines an annular pocket or annular intermediate space 14b between the ring and surface 9. By this arrangement, as the second ring 16 which is made of a deformable metallic material follows the curvilinear surface 15 of the first ring and is deflected along the curve shaped inner surface 15 to a point where it engages in an annular groove 17 formed, for example, by machining in the outer peripheral surface 9 of the body member 10. The second ring 16 is pressed in axially until it comes to rest with its inner edge abutting the flank 18 of the annular groove 17 and in this way secures or fixes the ring 14 against axial displacement. In axially pressing in the second ring 16, the first ring 14 can either be accurately positioned or can be pressed against the inner ring components 3 and 4 by applying an additional axial force in such a way that a preloading of the balls is produced in the bearing assembly.

Figure 2:
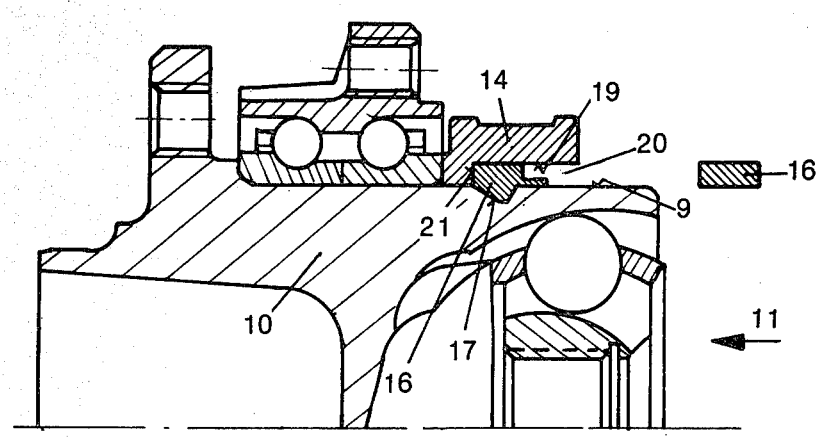
FIG. 2 is a transverse sectional view showing another embodiment of the present invention.

There is illustrated in FIG. 2 another embodiment of fastening means for fastening machine components shown in the environment of a wheel bearing assembly. The wheel bearing assembly is generally similar to that described previously and accordingly, the same reference numerals are applied to basic elements of the assembly. In the present instance, however, the first and second rings 14c and 16d are of a different configuration. For example, the ring 14c which likewise circumscribes and is positioned on the outer peripheral surface 9 of the body member 10 of the homokinetic joint 11 is of angular cross section defining an intermediate space 20 between the outer peripheral surface 9 of the body member 10 and the step bore 19 of the angular ring 14a. The second ring 16d which is made of a deformable metallic material is likewise initially pressed into the intermediate space 20 so that it is deformed in an axial direction in such a way that it forms a wedge-like projection 16e which seats in the annular groove 17 in the outer peripheral surface of the synchronized joint 11.

In this instance, the front face 21 at the end of the expanded bore 19 is formed in such a way that it drives the material of the deformable ring 16d inward into the groove 17. Thus, by reason of the axial load on the angular ring 14c upon assembly of the deformable ring 16d, preloading force can be applied to the roller bearing assembly independent of the deformation pressure on the ring 16d which is retained after the rings are assembled in place.

While particular embodiments of the present invention have been illustrated and described herein, it is not intended to limit the invention and changes and modifications may be made therein within the scope of the following claims.

What is claimed is:

1. A fastening means securing an annular first machine element against axial displacement on an annular second machine element, said second machine element having a shoulder against which the first machine element abuts and an annular groove spaced from said shoulder comprising a first ring member circumscribing the second machine element and having one axial end face confronting and abutting an axial end face of said first machine element and defines an annular pocket, a second one-piece ring made of a deformable material which is initially sleeve-shaped and engages in the annular pocket is deformed in a radial direction as a result of axially applied pressure during assembly into the annular pocket in such a way that a portion thereof engages in the annular groove in the second machine element and secures the two in place.

2. Fastening means as claimed in claim 1, wherein said second ring (16) mounted on the outside surface (9) of the shaft or the like (10) is provided with an inner surface (15, 21) which deflects the material of the initially sleeve-shaped ring (16) inward into the annular groove (17) during axial pressing in place.

3. Fastening means as claimed in claim 2, wherein said second ring (14) mounted on the outside surface (9)

of the shaft or the like (10) has a curve-shaped inner surface (15).

4. Fastening means as claimed in claim 2, wherein said second ring (16d) mounted on the outside surface (9) of the shaft or the like (10) is constructed with an angularly cross section and has a front face (21) at the end of the expanded axial bore (19) which deflects the deformable construction material inward.

* * * * *